United States Patent [19]
Brinks et al.

[11] Patent Number: 6,112,594
[45] Date of Patent: Sep. 5, 2000

[54] ACCELERATION MEASUREMENT DEVICE

[75] Inventors: Gerald Brinks, Burgrieden; Viktor Tiederle, Dettingen, both of Germany

[73] Assignee: Temic Telefunken Microelectronic GmbH, Heilbronn, Germany

[21] Appl. No.: 09/254,720

[22] PCT Filed: Sep. 4, 1997

[86] PCT No.: PCT/EP97/04810

§ 371 Date: Jun. 14, 1999

§ 102(e) Date: Jun. 14, 1999

[87] PCT Pub. No.: WO98/11442

PCT Pub. Date: Mar. 19, 1998

[30] Foreign Application Priority Data

Sep. 12, 1996 [EP] European Pat. Off. ............ 196 37 079

[51] Int. Cl.[7] .................................................. G01P 15/08
[52] U.S. Cl. ........................................ 73/493; 73/514.33
[58] Field of Search ............................... 73/493, 514.01, 73/514.16, 514.33

[56] References Cited

U.S. PATENT DOCUMENTS 5,866,818  2/1999  Sumi et al. .............................. 73/493

FOREIGN PATENT DOCUMENTS

| | | |
|---|---|---|
| 0 481 806 | 4/1992 | European Pat. Off. . |
| 0 665 438 | 8/1995 | European Pat. Off. . |
| 0 675 363 | 10/1995 | European Pat. Off. . |
| 39 15 069 | 11/1990 | Germany . |
| 93 09 918 | 1/1994 | Germany . |
| 43 22 034 | 2/1994 | Germany . |
| 94 15 052 | 12/1994 | Germany . |
| 44 46 890 | 6/1995 | Germany . |
| 195 21 712 | 12/1995 | Germany . |

*Primary Examiner*—John E. Chapman
*Attorney, Agent, or Firm*—Venable; Norman N. Kunitz

[57] ABSTRACT

Acceleration measurement device comprising a housing (1), an acceleration sensor unit (6) and a carrier (2) defining a location for the acceleration sensor unit (6). The carrier comprises connecting legs (3) in order to produce at least one mounting plane (18, 20) for the housing (1), wherein the location plane (20) is placed at any angle (Alpha) to the mounting plane (18, 19).

10 Claims, 2 Drawing Sheets

ACCELERATION MEASUREMENT DEVICE

BACKGROUND OF THE INVENTION

The invention relates to an acceleration measurement device consisting of a housing, an acceleration sensor element and a carrier that defines a location plane for the acceleration sensor element, with the device having connecting legs for creating at least one mounting plane for the housing.

Acceleration sensors are frequently used for passenger protection systems in motor vehicles and are designed to detect situations that are dangerous to the passengers and to activate retaining systems for the protection of the passengers.

The main sensitivity axis for known acceleration sensors is arranged perpendicular to or parallel to the mounting plane.

Such a configuration for an acceleration sensor according to the state of the technology is described in the European Patent Application 0 675 363 A2, where a micro-mechanical acceleration sensor and a subsequently connected evaluation circuit are arranged inside a housing.

The disadvantage of this arrangement is that only acceleration forces extending parallel to the mounting plane of the acceleration sensor can be measured.

It is therefore the object of the invention to specify a device for measuring the acceleration, which avoids the aforementioned disadvantages.

SUMMARY OF THE INVENTION

This object is solved by an acceleration measuring device, comprising a housing, an acceleration sensor element, and a carrier defining the location plane for the acceleration sensor element, said carrier having connecting legs for producing at least one mounting plane for the housing, wherein the location plane is arranged at an optional angle to the mounting plane.

Consequently, no effects of the sealing technology are present (e.g., soldering or welding). Owing to the production process selected (injection process), combining the sensor and electronic components in one housing, the sensor can be leveled easily. In addition, only production methods known from semiconductor technology are used. As a result of the dome used (glob top), the sensor element is effectively protected against environmental influences and mechanical stresses that occur. The spectrum for use is expanded considerably because of the angle that can be selected optionally, and the structural integration into the system is simplified considerably.

Further advantageous modifications of the invention are described. Preferably the location plane and the mounting plane be arranged at an angle of between 10° and 15° to each other. The angle between 10° and 15° is due to the sensor design. The locked-up stresses caused by the extrusion coating are consequently held at a minimum. It is only the combination of dome and suggested design for the sensor, which makes it possible to use the injection-molding technique.

The additional advantages of the invention are that with the device according to the invention, it is also possible to measure accelerations that do not extend either perpendicular to or parallel to the mounting plane of the arrangements. The device can furthermore be installed in two different installation positions, without requiring changes to the sensor design. This installation option in two planes permits an economic optimizing of the logistic and expands the use spectrum.

One exemplary embodiment of the invention is explained in further detail the drawing with the aid of Figures.

DETAILED DESCRIPTION OF THE PREFERRED EMBODIMENTS

Figure 1B:
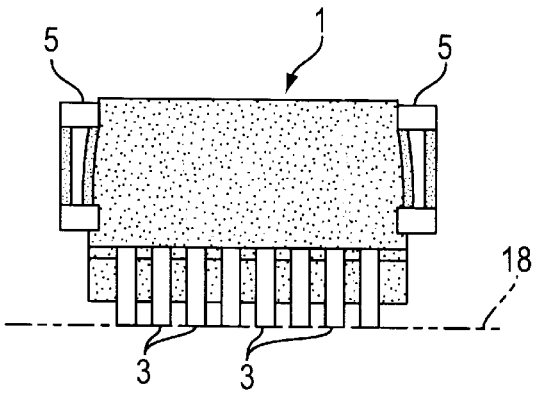
FIGS. 1a–1c are a view from above and two views from the side, respectively, of the acceleration measuring device according to the invention.
Figure 1A:
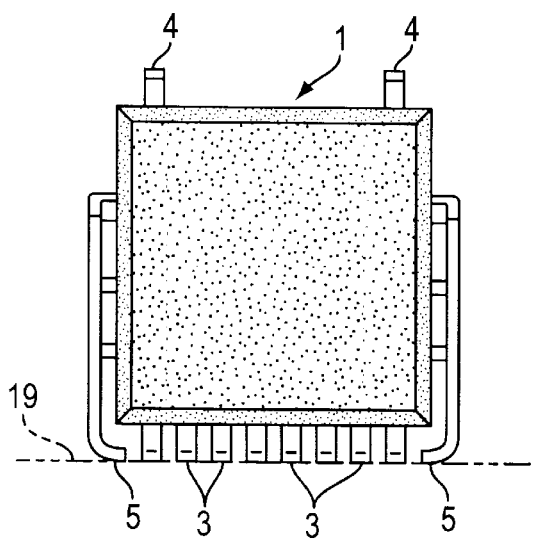
Figure 1C:
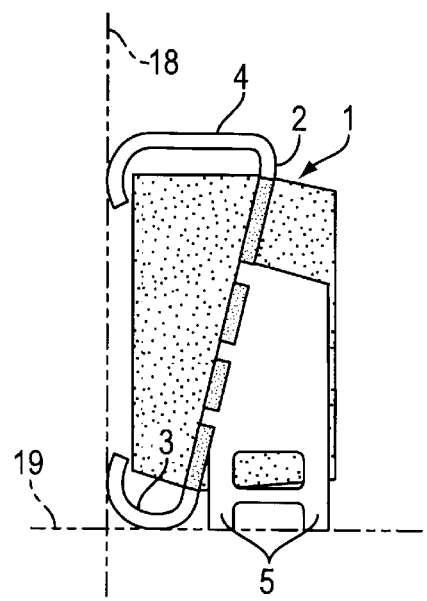

The FIGS. 1a–1c shows an exemplary embodiment of the device according to the invention, comprising a housing 1, a carrier 2 with connecting legs 3 bent in the shape of a J (J-wing) as shown, with first sheet metal fasteners 4 and second sheet metal fasteners 5. The housing 1 preferably is composed of a technical plastic and is produced with a known molding technique. The metal carrier 2 consists of a known copper alloy or iron alloy, which has a high electrical and thermal conductivity and sufficiently high mechanical solidity. In addition, it must be possible to process the alloy used by means of a stamping tool and it must be easy to solder and bond.

A first mounting plane 18 for installing the device, preferably in the chassis of a motor vehicle, is formed by the connecting legs 3 and the first sheet metal fasteners 4. The connecting legs 3 and the second sheet metal fasteners 5 form a second mounting plane 19.

Figure 2:
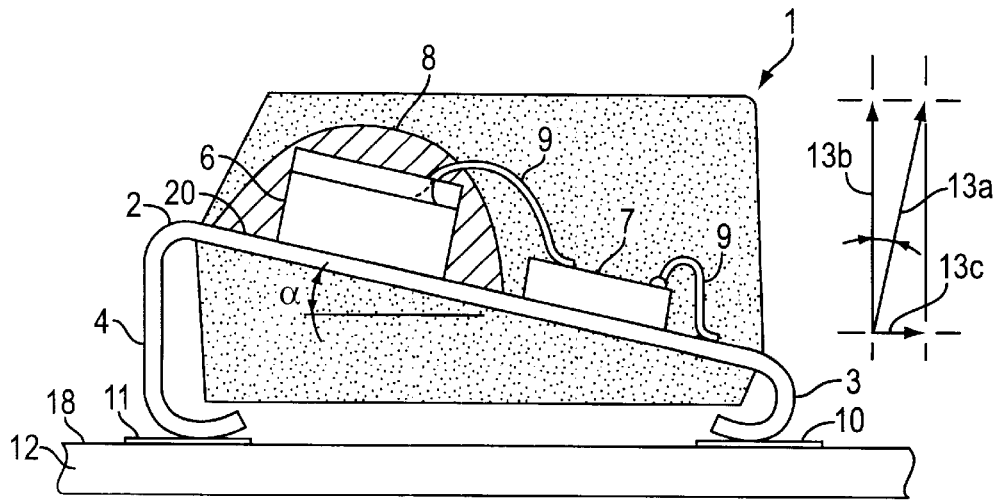
FIG. 2 is a section through the device according to FIG. 1.

FIG. 2 shows the internal structure of the device according to the invention. An acceleration sensor element 6 and a subsequently installed evaluation unit 7 are arranged on a location plane 20, inclined at an optional angle $\alpha$ of, for example, between 10° and 15° to the mounting plane 18 and formed by the carrier 2 that is enclosed by the housing 1. The size of angle $\alpha$ in this case depends on the design of the acceleration sensor element 6 used. The acceleration sensor element 6 is provided with a dome (glob top) 8 during the molding operation in order to protect it. This dome is made, for example, of an elastic plastic mass, such as silicone. The evaluation unit 7 is an application-specific integrated circuit (ASIC). The acceleration sensor element 6 and the evaluation unit 7 are connected to one another by bonding wires 9 formed of for example, gold, a gold alloy, aluminum or an aluminum alloy, and are fastened on the carrier 2 by means of a conductive or insulating adhesive or through chip-bonding, so that an electrically and thermally conductive connection is created.

In order to measure an acceleration either perpendicular to or parallel to the mounting plane 18, the sensitivity axis must be positioned perpendicular to or parallel to the mounting plane 18. This is achieved with a suitable selection of the angle $\alpha$. If the sensitivity axis is slanted in the direction of arrow 13a, it is also possible to measure accelerations that are not perpendicular to the first mounting plane 18 as a result of additional sensitivity axes 13b and 13c, owing to the fact that the acceleration sensor element 6, which is preferably a known piezoresistive resistance element in connection with a seismic mass, is arranged at angle α to the circuit board 12.

Figure 3:
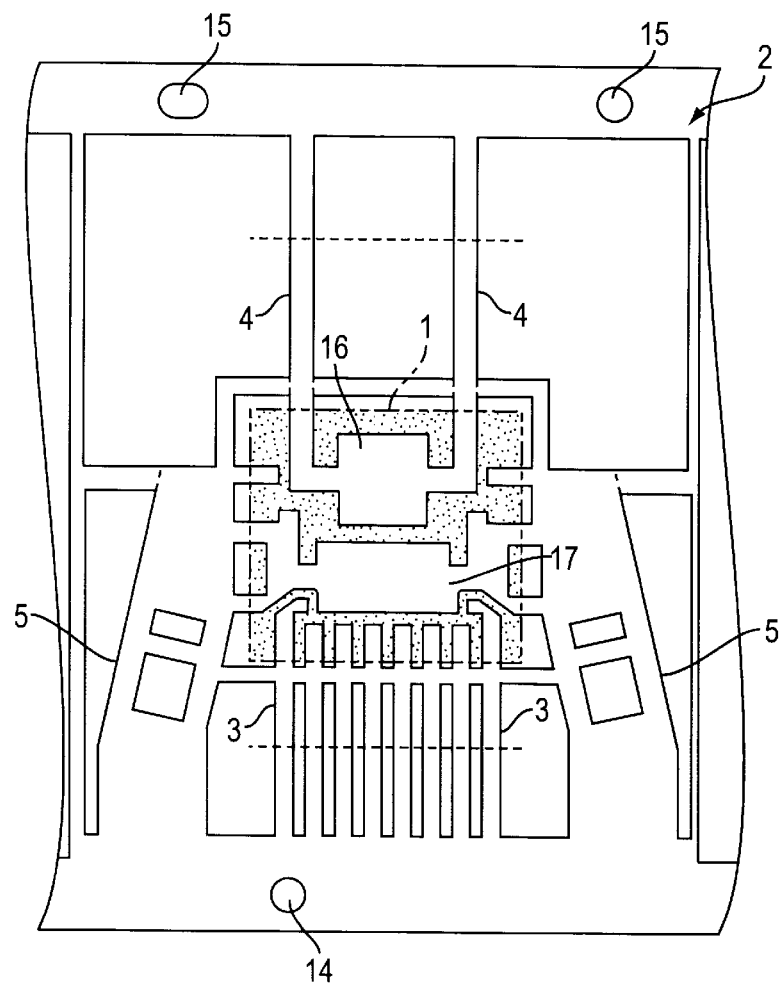
FIG. 3 shows the carrier belonging to the device according to the invention.

FIG. 3 shows the carrier 2 used for setting up the device according to the invention, with a position marking 14 and transporting holes 15. Later on, a surface 16 is provided with an acceleration sensor element and surface 17 with an evaluation unit. The carrier 2 furthermore contains connecting legs 3 and sheet metal fasteners 4 and 5 that have not yet been bent. The sheet metal fasteners 4 can also be used as connecting legs if they are galvanically separated through cutting them free off the remaining carrier 2.

Figures 4A, 4B:
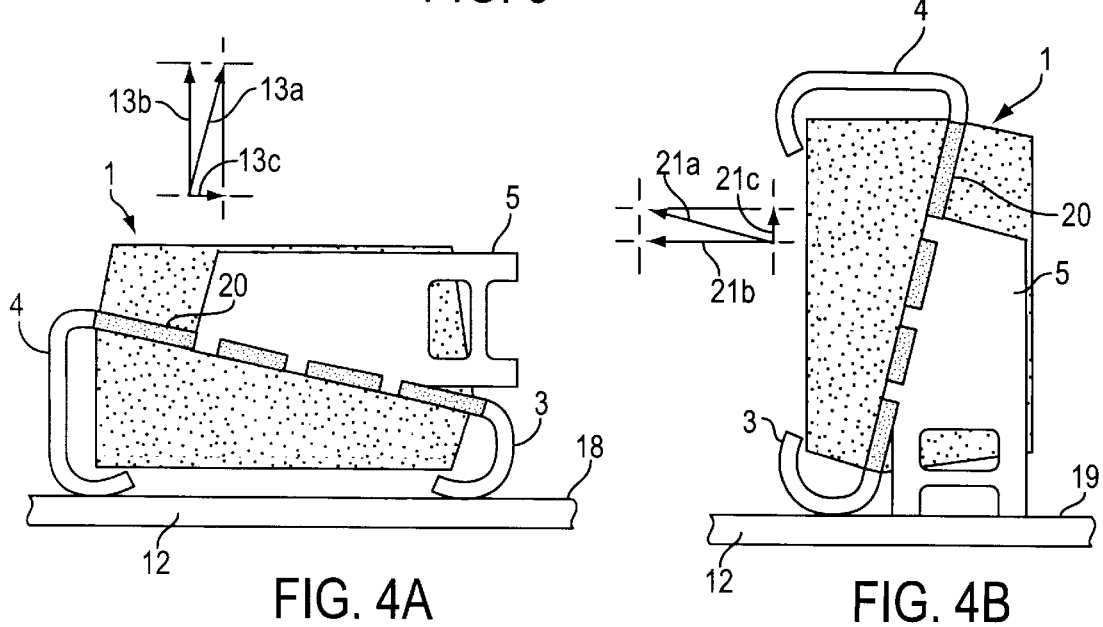
FIG. 4a shows the device according to the invention, wherein the main sensitivity axis extends perpendicular to the mounting plane.
FIG. 4b shows the device according to the invention, wherein the main sensitivity axis extends parallel to the mounting plane.

The FIGS. 4a and 4b disclose that the device can be installed in two different positions, without requiring design changes, e.g., on the housing 1.

In order to sensitize for accelerations, which are primarily effective in arrow direction 13b, perpendicular to the mounting plane 18, only the connecting legs 3 and the first sheet metal fasteners 4 are used for fastening the device on the circuit board 12, as can be seen in FIG. 4a. The connecting legs 3 and the first sheet metal fasteners 4 in this case form the first mounting plane 18.

However, in order to obtain a main sensitivity axis according to one arrow direction 21b, that is perpendicular to the second mounting plane 19, the connecting legs 3 and the second sheet metal fasteners 5 are soldered to the circuit board 12. The connecting legs 3 and the second sheet metal fasteners 5 in this case form the second mounting plane 19. However, with a suitable selection of the angle α (FIG. 2), it is possible to detect accelerations that are effective either perpendicular to or parallel to the mounting plane 19 according to the arrow direction 21b or 21c.

The acceleration measuring device according to the invention is primarily used in motor vehicles to trigger passenger protection systems, if there is danger to the passengers as a result of a driving situation. The arrangement can be mounted in two different installation positions, without requiring changes to the design. Owing to the acceleration sensor element arrangement, which is not parallel to the mounting planes, it is possible to also detect accelerations that do not extend perpendicular to a mounting plane, particularly lateral accelerations.

What is claimed is:

1. An acceleration measuring device, consisting of a carrier (2) and a housing (1) for an acceleration sensor element (6), having the following features:

a) the carrier (2) has a location plan (20) for the acceleration sensor element (6), bent connecting legs (3) and bent sheet metal fasteners (5), b) the bent connecting legs (3) and the bent sheet metal fasteners (5) form a mounting plane (19) for the acceleration measuring device, c) the carrier (2) contains additional bent sheet metal fasteners (4), d) the bent connecting legs (3) and the additional bent sheet metal fasteners (4) form an additional mounting plane (18) for the acceleration measuring device, and e) the location plane (20) is arranged at an angle I (α) to the mounting plane (18) and an angle (α+90) to the further mounting place (19), wherein the angle (α) is between 10° and 15°.

2. A device according to claim 1, wherein an evaluation unit (7) is arranged on the carrier (2).

3. A device according to claim 2, wherein an application-specific integrated circuit (ASIC) is used as the evaluation unit (7).

4. A device according to claim 1, wherein a piezoresitive element is used as acceleration sensor element (6).

5. A device according to claim 1, wherein the bent connecting legs (3) are bent to form a j (j-wing).

6. A device according to claim 1, wherein the carrier (2) is made of a copper alloy.

7. A device according to claim 1, wherein the carrier (2) is made of an iron alloy.

8. A device according to claim 1, wherein the acceleration sensor element (6) and the evaluation unit (7) are connected to each other or to the carrier (2) by bonding wires (9).

9. A device according to claim 8, wherein the bonding wires (9) are made of gold or a gold alloy.

10. A device according to claim 8, wherein the bonding wires (9) are mode of aluminum or an aluminum alloy.

* * * * *